United States Patent
Liljeblad et al.

(10) Patent No.: US 7,815,001 B2
(45) Date of Patent: Oct. 19, 2010

(54) POWER GENERATION ARRANGEMENT

(75) Inventors: Benny Liljeblad, Lerum (SE); Owe Granäng, Olofstorp (SE); Lars Nilsson, Uddevalla (SE)

(73) Assignee: Volvo Lastvagnar AB (SE)

( * ) Notice: Subject to any disclaimer, the term of this patent is extended or adjusted under 35 U.S.C. 154(b) by 246 days.

(21) Appl. No.: 12/093,799

(22) PCT Filed: Nov. 16, 2006

(86) PCT No.: PCT/SE2006/001302

§ 371 (c)(1),
(2), (4) Date: Sep. 5, 2008

(87) PCT Pub. No.: WO2007/058594

PCT Pub. Date: May 24, 2007

(65) Prior Publication Data

US 2008/0308327 A1    Dec. 18, 2008

(30) Foreign Application Priority Data

Nov. 21, 2005  (SE) .................................. 0502556

(51) Int. Cl.
*B60K 25/02*  (2006.01)
*F02B 67/08*  (2006.01)
(52) U.S. Cl. .................................. 180/53.4; 180/53.1
(58) Field of Classification Search ............. 180/53.4, 180/53.1, 53.7, 53.8
See application file for complete search history.

(56) References Cited

U.S. PATENT DOCUMENTS 3,080,152 A  *  3/1963  Lendved ...................... 366/44
6,321,867 B1 *  11/2001 Kowalyk ..................... 180/307
6,672,414 B2 *  1/2004  Laflamme ................... 180/53.4

(Continued)

FOREIGN PATENT DOCUMENTS

DE        10149388 A1   12/2002

(Continued)

OTHER PUBLICATIONS

Notification of Transmittal of the International Search Report and the Written Opinion of the International Searching Authority, or the Declaration, dated Feb. 20, 2007.

*Primary Examiner*—Paul N Dickson
*Assistant Examiner*—Drew Brown
(74) *Attorney, Agent, or Firm*—Novak Druce + Quigg LLP

(57) ABSTRACT

The invention relates to a power generating unit mounted to a source of rotational energy and arranged to supply hydraulic pressure and flow to at least one driven accessory. The power generating unit comprises a housing removably mounted on the source of rotational energy, an input shaft adapted to be connected to the source of rotational energy, said input shaft comprising a first end provided with means for engaging the input shaft to a power output interface on the source of rotational energy, a second end connected to a hydraulic pump and means for selectively engaging the input shaft to the hydraulic pump. The input shaft, the means for selectively engaging the input shaft, and the hydraulic pump are arranged as an integral power generating unit within said housing. The invention further relates to a vehicle provided with such a power generating unit.

23 Claims, 3 Drawing Sheets

U.S. PATENT DOCUMENTS

| | | |
|---|---|---|
| 6,830,116 B2 * | 12/2004 | Ishimaru et al. ............ 180/53.4 |
| 6,994,180 B1 * | 2/2006 | Hauser et al. ............... 180/305 |
| 7,455,132 B2 * | 11/2008 | Acharya et al. ............ 180/53.4 |
| 7,617,892 B2 * | 11/2009 | Nishimoto et al. ......... 180/53.4 |
| 2004/0081014 A1 | 4/2004 | Chanasyk et al. |
| 2007/0017729 A1 * | 1/2007 | Nishimoto et al. .......... 180/374 |

FOREIGN PATENT DOCUMENTS

EP 0850797 A1 7/1998

* cited by examiner

US 7,815,001 B2

POWER GENERATION ARRANGEMENT

TECHNICAL FIELD

This invention relates to a power generating unit mounted to a source of rotational energy at one or more predetermined locations and arranged to supply hydraulic pressure and flow to at least one driven accessory.

BACKGROUND ART

In order to be able to handle a load in a rational manner, a truck often requires a load handling unit. The most common examples of such load handling equipment are tippers and cranes. Demountable load carriers such as a hook-lift, refuse handling equipment, rotating cement mixers and compressors for loading and unloading bulk loads are the most common. In order to utilise the engine of the truck to provide power for this load handling equipment it is necessary to fit a power take-off unit, often referred to as a PTO. Power from this unit can be transferred either mechanically via a propeller shaft or belts, or hydraulically by fitting a hydraulic pump to the power take-off. Power take-offs are divided into two categories, those independent of a clutch in the vehicle transmission and those dependent on this clutch.

A clutch-independent power take-off or PTO may be fitted to the engine or between the engine and the gearbox. A PTO of this type may be operated whenever the engine is running. The speed and power output of the PTO is directly dependent on the engine speed, irrespective of whether the truck is being driven or is at a standstill. Clutch-independent PTOs are suitable for devices such as load handling equipment, which is used when the truck is being driven. Examples of load handling equipment are demountable mechanical and hydraulic units, refuse trucks, cement mixers and snow ploughs.

A clutch-dependent power take-off is fitted to a gearbox or a transmission adjacent the gearbox and may be driven by, for example, an idler shaft in the gearbox. This means that the PTO can only deliver hydraulic or mechanical power when a clutch between the engine and the gearbox is engaged. The PTO speed is dependent on the engine speed and the speed of the idler shaft. If the gearbox has a range splitter, the range selection may affect the speed of the idler shaft and thereby the speed of the PTO. The PTO can be connected to a hydraulic pump, for delivering hydraulic pressure, or to a propeller shaft, for delivering mechanical power or torque. Some PTOs may feature double connection to provide both a hydraulic pump and/or a mechanical propeller shaft.

In a hydraulic system, a hydraulic pump, which delivers hydraulic pressure and flow to an auxiliary equipment to be driven, is connected to the power take-off. There are different types of hydraulic PTOs. One type of PTO is fixedly connected to the engine or between the engine and the gearbox, as described above. This type of PTO is constantly engaged and is suitable for the connection of a PTO driving a hydraulic pump. The driven auxiliary equipment can be started and stopped using a valve unit provided on the PTO, on the auxiliary equipment or at a suitable position on the vehicle and controls the flow of hydraulic oil through the auxiliary equipment. In this case the hydraulic pump is constantly delivering pressurized oil, either to the equipment or to an oil reservoir. This type of PTO is suitable for vehicles that regularly use driven auxiliary equipment.

In order to allow a hydraulic pump in a PTO to idle, a bypass valve may be provided. The bypass valve is controlled by the user and allows the oil to bypass the hydraulic pump when the equipment is not used. This is done by actuating the bypass valve to connect an outlet port of the hydraulic pump to an inlet port thereof. The pump will then be running idle with a relatively low resistance, which may reduce the losses caused by driving the pump unnecessarily and may also minimise the wear of the pump. This type of PTO is also suitable for equipment that is used regularly and is suitable for use when the vehicle is running.

Other types of PTO are possible to engage and disengage from the engine or the transmission. One such PTO uses a claw coupling wherein a coupling socket couples together two splined shafts by means of a shift fork. This type of PTO allows disengagement during use. However, in order to engage the PTO both splined shafts must be at a complete standstill. Consequently, when this type of PTO is mounted on a gearbox, the vehicle must stand still with the clutch disengaged when the shift fork is actuated. This type of PTO is therefore not always suitable for mounting on the engine or between the engine and the gearbox.

A further type of PTO uses a hydraulically actuated multi-disc clutch to engage and disengage the PTO. This arrangement makes it possible to engage and disengage the PTO when the input shaft is rotating. Hence, this type of PTO may be mounted both on the engine and on the gearbox, and can be used for driving auxiliary equipment that needs to be engaged when the vehicle is being driven.

A problem relating to a PTO in direct connection with the engine or the gearbox is that the hydraulic system can not be disengaged. As described above, the pump is circulating the fluid of the hydraulic system whenever the engine is running. Consequently the pump circulates the fluid through the system even if the auxiliary equipment is not in use. This is a problem, as the fuel consumption of the vehicle is increased unnecessarily when the auxiliary equipment is not used. Furthermore, when the auxiliary equipment is inactive, this circulating of fluid in the tubes of the hydraulic system by the pump causes unnecessary wear of the hydraulic system. Subsequent repairs or replacement of worn out parts induces further cost.

An additional problem with a PTO that can not be disengaged is that the vehicle can not be driven if there is a leak in the hydraulic system, e.g. if a hydraulic line is ruptured or otherwise damaged. As the PTO is constantly engaged, operation of the vehicle will cause the hydraulic fluid to leak out. Apart from causing a spill of hydraulic fluid, lack of fluid in the hydraulic system may cause the hydraulic pump to break down due to lack of lubrication. To avoid this, the hydraulic system must either be repaired in situ, or the vehicle must be towed to a repair facility.

In order to solve the problems relating to increased fuel consumption and unnecessary wear of components in the hydraulic system, known systems have introduced a bypass valve. The bypass valve disconnects the hydraulic system from the hydraulic pump, so that the pump is idling. This may give a reduction of the wear in the hydraulic system and reduces fuel consumption. However, the PTO is still engaged and the pump is still running. A problem with this type of PTO is that the hydraulic system is driven directly by the gear transmission of the engine when the vehicle is being driven. Consequently, the vehicle can not be driven without causing a spill of hydraulic fluid and may cause the hydraulic pump to break down, as stated above.

A solution to the problem of having a PTO with an idling hydraulic pump is to use a clutch that allows for a complete disengagement of the PTO from the engine or gearbox, as described above. Although this system does allow disengagement of the PTO, it is a relatively heavy and costly system. A further problem is that a standard interface for such a PTO has to be ordered and installed during production of a stationary engine or a vehicle engine. The standard interface has an input side connected to a suitable drive shaft or similar on the engine or the gearbox. The standard interface allows a mechanical drive unit or hydraulic pump to be connected for driving auxiliary equipment. Post-production fitting, or retrofitting, a standard interface for such a system is expensive and may, providing that it is at all possible, require substantial modification of the engine and/or the gearbox.

Although original vehicle manufacturers have supplied general purpose hydraulic pumps with vehicles suitable for supporting hydraulic power take off operation, the provision of controls and hydraulic lines has generally been left to after market specialists. Such controls have been retrofitted to vehicles, typically by the addition of wiring and hydraulic lines. Integration with other vehicle systems has been poor and the location of hydraulic tanks and modification of vehicle body systems can compromise owners' chassis warranties. Nor have these accessories been as reliable, light weight, or small as possible, nor have they conveniently provided as much power as can be required without modification of a vehicle's hardware.

It is accordingly an object of the present invention to provide a power generating unit that overcomes the above problems. Such a power generating unit aims to reduce fuel consumption of the engine when the auxiliary equipment is not in use, to reduce unnecessary wear of the hydraulic system, to facilitate replacement of damaged or worn units, as well as repair of parts of the hydraulic system, and to allow a vehicle provided with such a PTO to be driven even if the hydraulic system has been damaged.

DISCLOSURE OF INVENTION

The above problems are solved by a power generating unit as claimed in claim 1 and its dependent claims, and a vehicle provided with such a power generating unit, as claimed in claim 15.

According to a preferred embodiment, the invention relates to a power generating unit mounted to a source of rotational energy and arranged to supply hydraulic pressure and flow to at least one driven accessory. The power generating unit may comprise a housing removably mounted on the source of rotational energy, an input shaft adapted to be connected to the source of rotational energy. The input shaft may comprise a first end provided with means for engaging the input shaft to a power output interface on the source of rotational energy, a second end connected to a hydraulic pump and means for selectively engaging the input shaft to the hydraulic pump. The means for selectively engaging the input shaft to the pump may be located adjacent the second end of the input shaft, or at any point between said first and second ends. The input shaft, the means for selectively engaging the input shaft, and the hydraulic pump may be arranged as an integral power take-off unit within said housing.

The source of rotational energy may be a suitable prime mover, such as an internal combustion engine, an electric motor or any type of hybrid motor or engine. The prime mover may be stationary or arranged for driving a vehicle or marine vessel. Alternatively, the source of rotational energy may be any part of a transmission, such as a vehicle gearbox or a suitable part of a vehicle transmission between the gearbox and the driven wheels, which are selectively engaged to and driven by the prime mover. The transmission may be both stationary, for driving a stationary generator or other arrangements, or be part of a moving structure such as a vehicle or marine vessel.

According to one embodiment, the means for selectively engaging the input shaft to the hydraulic pump may be a clutch. A clutch may be connected to the prime mover, adjacent a main clutch for connecting the prime mover to the transmission or to a suitable location on the transmission. When mounted in certain locations on the gearbox or transmission, the clutch may be a one-way type clutch to allow the clutch to slip when a reverse gear is selected. Suitable clutches for the power generating unit may be sliding clutches, friction clutches, hydraulic clutches, or similar. The clutches may be actuated electronically, pneumatically, electromagnetically or by any other suitable actuating means.

According to one embodiment, the means for selectively engaging the input shaft to the hydraulic pump is a mechanically engageable coupling, such as a claw coupling. A claw coupling comprises a coupling socket for coupling together two splined shafts by means of a shift fork. A coupling of this type may be connected to the prime mover or adjacent a main clutch for connecting the prime mover to the transmission.

In some cases it may be desirable to provide an arrangement with a combined clutch, as described above, and a mechanically engageable coupling, such as a claw coupling or similar. Such an arrangement may allow greater forces to be transferred through the power generating unit. In operation, the power generating unit can be started using a clutch, transferring a relatively low torque, where after a sliding coupling or claw coupling is actuated to allow transfer of a relatively high torque.

According to one embodiment, the source of rotational energy may comprise at least one power output interface to which the power generating unit may be connected. A power generating unit provided with an integrated power connection that can, be connected to such a power output interface is easy to remove or replace. In addition, the power generating unit may be possible to locate in multiple positions on the source of rotational energy. In this way, a single unit may be removed and attached at any location where a compatible power output interface is provided. Alternatively, more than one unit can be provided if a single power generating unit is insufficient for driving a particular accessory, or if it is desired to drive multiple accessories.

Each power output interface may have a dedicated or a universal connection for cooperation with the integrated power connection provided on each power generating unit. A dedicated connection may be provided for a power generating unit arranged to be mounted on a single location or at a limited number of locations on the source of rotational energy. This may be, for instance, a power generating unit with a claw coupling for mounting on a prime mover such as an internal combustion engine. One reason for using different connections may be to prevent an inexperienced user from mounting a particular type of power generating unit in a location where it is not suitable for use.

A universal connection may be provided in power output interfaces for cooperation with a power generating unit arranged to be mounted at multiple locations on both the prime mover and the transmission of the source of rotational energy. This may be, for instance, a power generating unit with a clutch for mounting at one or more locations on a prime mover, such as an internal combustion engine, on a gearbox or on a transmission. A universal connection may also be provided with means that allow mounting of power generating units provided with a clutch or a similar connectable and disconnectable device in any power terminal, while preventing connection of power generating units intended for a dedicated power output interface in certain predetermined locations. In this way it is possible to provide a common interface between the source of rotational energy and its associated power generating units. The common interface may also allow a power generating unit to be mounted at one or more suitable locations, while preventing it from being mounted in an unsuitable location. For example, a power generating unit may have a predetermined maximum power rating or input speed, which rating may be exceed if it is connected to a power output interface that is able to deliver a higher power rating or input speed. This would not be possible when an interface according to the invention is used.

Alternatively, the respective dedicated or universal connections may be provided on each power generating unit, allowing them to be connected to power output interfaces in some or all locations on the source of rotational energy.

The universal or dedicated connections may comprise conventional means for connecting a power output interface on the source of rotational energy to the input shaft of the power generating unit. Examples of such connecting means may be gears or splines.

In order to allow control of the pressure and/or volume delivered by the hydraulic pump, the pump may be a variable displacement pump. Examples of suitable pumps for the application according to the invention are fixed or variable displacement piston pumps, either with inline or bent axis, vane pumps or gear pumps with one or more flows.

Under certain circumstances, the source of rotational energy may be arranged to be operated independently of the power generating unit when the input shaft is disengaged from a driving shaft in the power terminal. According to the invention, the power generating unit may be arranged to supply hydraulic pressure and flow only when the input shaft and the hydraulic pump is engaged to the driving shaft. In this way the hydraulic pump is only operated when hydraulic pressure and flow is required by one or more driven accessories. This reduces energy consumption of the prime mover and minimized wear of the pump and the power take-of unit.

In addition, with the means for selectively engaging the input shaft to the hydraulic pump is disengaged there will be no flow of hydraulic fluid through the pump of its associated hydraulic lines. This allows operation of the source of rotational energy even if a leak has occurred in the power generating unit or in the hydraulic system connected to the hydraulic pump. When the prime mover is an internal combustion engine in a vehicle, this function allows the vehicle to be driven in a "limp home"-mode to a repair facility where the leak can be repaired.

The hydraulic pump in the power take-off unit and the source of rotational energy, that is the prime mover or an associated gearbox and/or a transmission, may be provided with a common source of hydraulic fluid. Depending on the type of source of rotational energy, the common hydraulic fluid may be a suitable type of oil, such as engine oil or a liquid lubricant. Alternatively, the hydraulic pump may be provided with a separate source of hydraulic fluid. In this case any suitable type of hydraulic fluid may be used for the power generating unit. In both cases, the hydraulic fluid may be arranged to fill the common power generating housing entirely or in part and act as a lubricant for the component parts contained within the housing.

The invention also relates to a vehicle provided with a prime mover and arranged for driving at least one power generating unit, in which a power take-off unit is arranged to supply hydraulic pressure and flow to at least one driven accessory. As stated above, the power generating unit comprises a housing removably mounted on a source of rotational energy, an input shaft adapted to be connected to the source of rotational energy, said input shaft comprising a first end provided with means for engaging the input shaft to a power output interface on the source of rotational energy, a second end connected to a hydraulic pump and means for selectively engaging the input shaft to the pump. The input shaft, the means for selectively engaging the input shaft, and the hydraulic pump may be arranged as an integral power generating unit within said housing.

Accordingly, the vehicle and its prime mover may be arranged to be operated independently of the power generating unit when the input shaft and/or the means for selectively engaging the input shaft to the pump is disengaged from the driving shaft. This is achieved by arranging the power generating unit to supply hydraulic pressure and flow only when the input shaft and the means for selectively engaging the input shaft to the pump is engaged to the driving shaft of the prime mover or its transmission.

According to the invention, the drive unit may be a stationary engine or an engine for a vehicle, which engine may be connected to a manual or automatic gearbox, a continuously variable transmission (CVT) or a similar gear transmission, and a transmission for transferring power from a gear transmission to the driving wheels.

BRIEF DESCRIPTION OF DRAWINGS

Embodiments of the present invention will now be described by way of example with reference to the accompanying drawings in which.

EMBODIMENTS OF THE INVENTION

Figure 1:
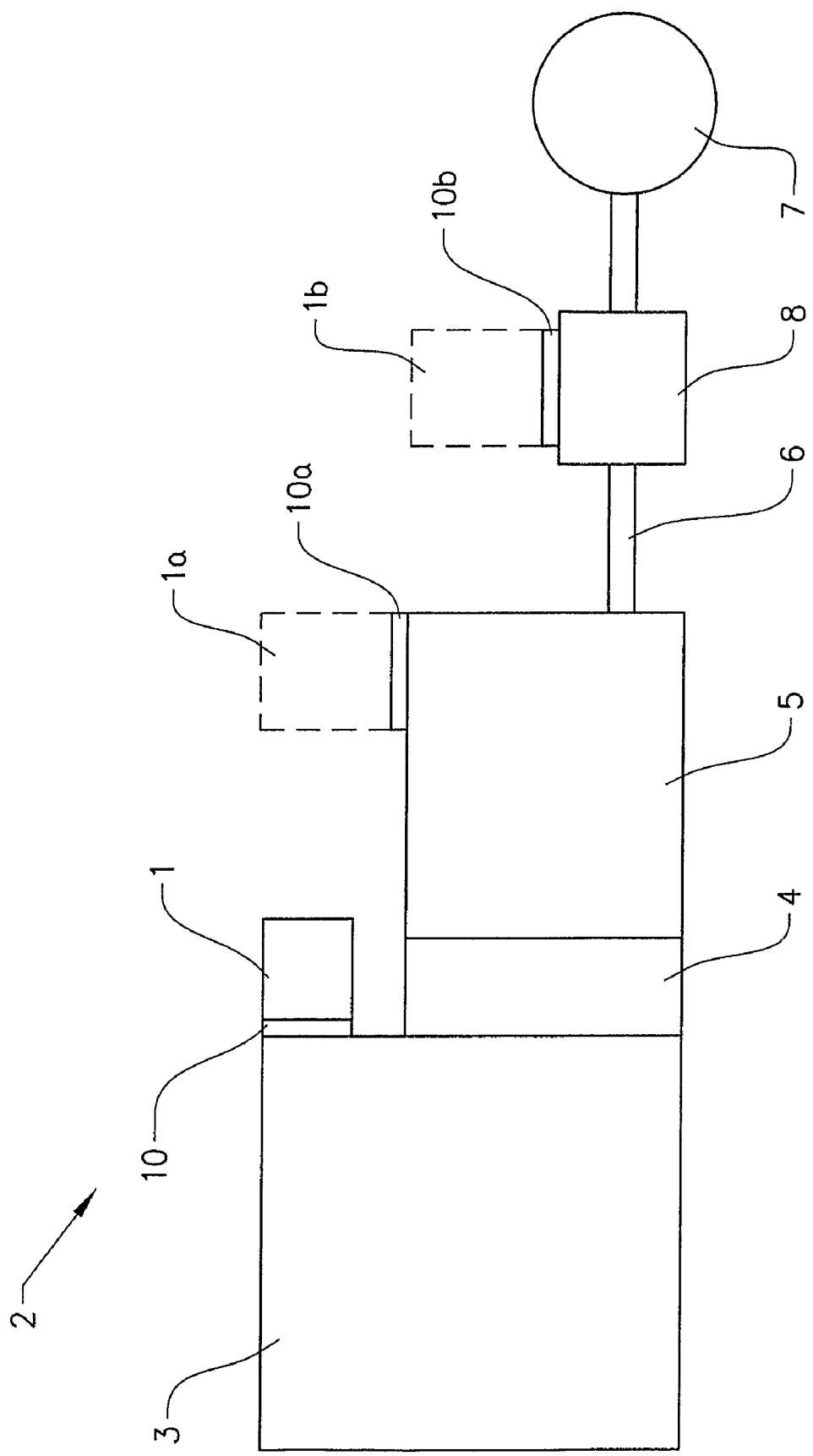
FIG. 1 shows a preferred embodiment of a drive system with a hydraulic pump system.

FIG. 1 shows a power generating unit 1 mounted to a source of rotational energy 2 and arranged to supply hydraulic pressure and flow to at least one driven accessory (not shown). In this example, the source of rotational energy 2 is an internal combustion engine 3, which is drivingly connected to a vehicle transmission. The transmission comprises a clutch 4 located between the engine 3 and a gearbox 5, where the gearbox 5 has an output shaft 6 for driving a drive axle 7. An additional gearing unit 8 can be provided on the output shaft 6 between the gearbox 5 and the drive axle 7, or on the drive axle 7 itself.

The source of rotational energy 2 is provided with at least one power output interface 10. The power generating unit 1 can be connected to or disconnected from power output interface 10 at any time during the lifetime of the source of rotational energy 2. As can be seen from FIG. 1, an additional power generating unit 1a (indicated with dashed lines) can be connected to a power output interface 10a on the gearbox 5. A further power generating unit 1b (indicated with dashed lines) can be connected to a power output interface 10b on the additional gearing unit 8 on the output shaft 6 between the gearbox 5 and the drive axle 7.

These locations are shown by way of example only. Power output interfaces can be provided at one or more suitable locations on the engine, the gearbox or on any other parts of the transmission 6, 7, 8. If allowed by the power rating of the power generating unit 1, the same unit can be connected to all power output interfaces 10, 10a, 10b. Alternatively, separate power generating units 1, 1a, 1b are used at each location.

Figure 2:
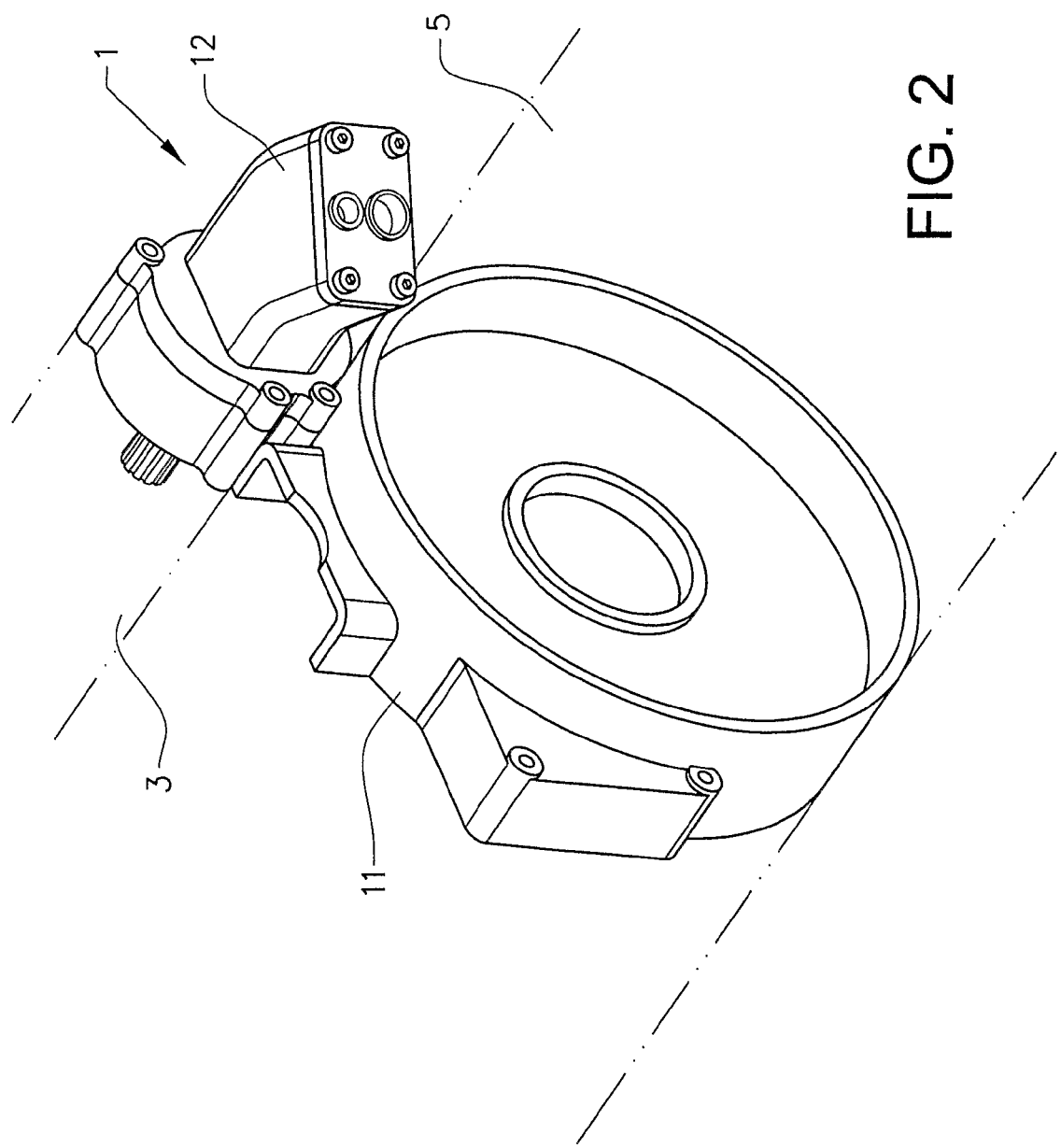
FIG. 2 shows another preferred embodiment of a drive system with a hydraulic pump system.

FIG. 2 shows a power generating unit 1 removably mounted on a casing 11 for a clutch (not shown) connecting an internal combustion engine 3 to a gearbox 5 (both indicated with dashed lines). The power generating unit 1 is bolted onto the casing 11, after insertion of a clutch (see FIG. 3) and an outer end of an input shaft into said casing 11. As the input shaft is inserted, it engages a driving shaft located inside the corresponding casing for the internal combustion engine 3. Once the power generating unit 1 is secured to the casing 11, the input shaft can be driven by the driving shaft to drive a hydraulic pump (not shown) located in an outer section 12 of the power generating unit 1. Operation of the hydraulic pump is controlled by engaging or disengaging the clutch between the outer end of the input shaft and the hydraulic pump. In this way the hydraulic pump is only operated when hydraulic pressure and flow is required by one or more driven accessories.

Figure 3:
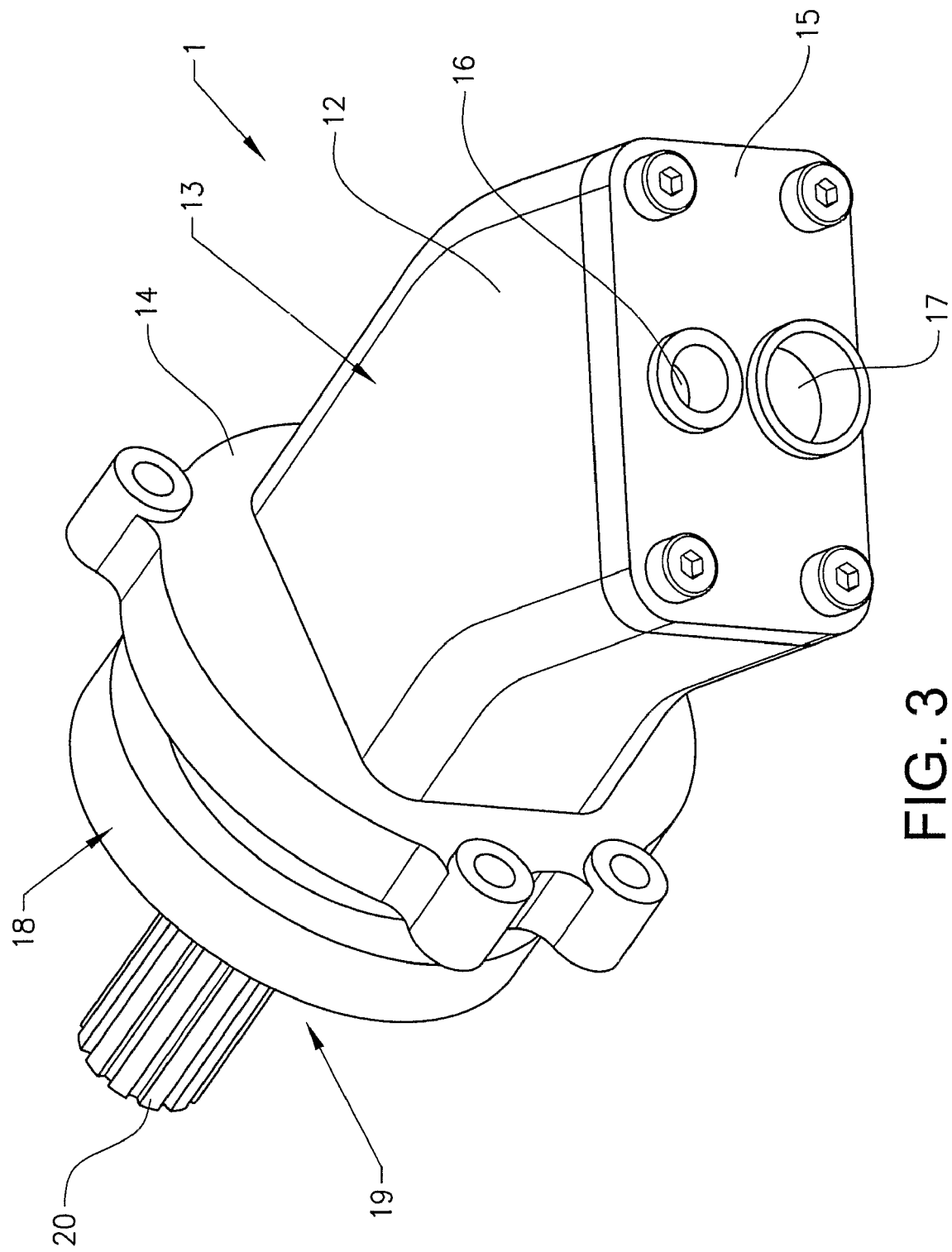
FIG. 3 shows the drive system in connection with the hydraulic pump system in the form of a gear assembly.

FIG. 3 shows the power generating unit 1 shown in FIG. 2 comprising a housing 13 provided with a flange 14 for connecting the housing 13 to the combustion engine. The housing 13 extending from one side of the flange 14 contains a hydraulic pump (not shown), has an outer end surface 15 with an inlet port 16 and an outlet port 17, for supplying hydraulic pressure and flow to a hydraulically driven accessory connected to the outer end surface 15. Connection of hydraulically driven accessories to the end surface 20 can be done by conventional means.

Extending from the opposite side of the flange 14 is a an additional section of the housing 13, enclosing a controllable clutch 18, and one end of an input shaft 19 adapted to be connected to a driving shaft in the internal combustion engine. The input shaft 19 has a first, outer end provided with splines 20 for engaging the input shaft to the power output interface on the source of rotational energy (see FIG. 1), a second end connected to the hydraulic pump. The clutch 18 for selectively engaging the input shaft to the pump is located between the first and second ends of the input shaft. The input shaft, the means for selectively engaging the input shaft, and the hydraulic pump are arranged as an integral power take-off unit within housing 13. Suitable pumps for supplying hydraulic pressure or flow are fixed or variable displacement piston pumps, either with inline or bent axis, vane pumps or gear pumps with one or more flows.

A power output interface according to the invention can have a dedicated or a universal connection for cooperation with the integrated power connection provided on each power generating unit. A dedicated connection is provided for a power generating unit arranged to be mounted on either a single location or at a limited number of locations on e.g. the internal combustion engine or the gearbox. According to one example, this is achieved by providing different power generating units with individual connections, such a claw coupling or a splined connection. According to a second example, the physical shape of the connection between a power output interface and a power generating unit can be used for this purpose. For instance, a particular spacing between the bolts attaching the flange on the housing can be used to prevent mounting of predetermined types of power generating units. By using connections as described above an inexperienced user is effectively prevented from mounting a particular type of power generating unit in a location where it is not suitable for use.

The invention is not limited to the above embodiments, but may be varied freely within the scope of the claims.

The invention claimed is:

1. A power generating unit mounted to a source of rotational energy and arranged to supply hydraulic pressure and flow to at least one driven accessory, the power generating unit comprising a housing removably mounted on the source of rotational energy, an input shaft adapted to be connected to the source of rotational energy, said input shaft comprising a first end provided with means for engaging the input shaft to a power output interface on the source of rotational energy, a second end connected to a hydraulic pump and means for selectively engaging the input shaft to the hydraulic pump, where the input shaft, the means for selectively engaging the input shaft, and the hydraulic pump are arranged as an integral power generating unit within said housing.

2. A power generating unit according to claim 1, wherein the source of rotational energy is a prime mover.

3. A power generating unit according to claim 1, wherein the source of rotational energy is a gearbox or transmission selectively engaged to and driven by the prime mover.

4. A power generating unit according to any one of claims 1, wherein the means for selectively engaging the input shaft to the hydraulic pump is a clutch.

5. A power generating unit according to any one of claims 1, wherein the means for selectively engaging the input shaft to the hydraulic pump is a clutch connected to a mechanically engageable coupling.

6. A power generating unit according to claim 1, wherein the means for selectively engaging the input shaft to the hydraulic pump is a mechanically engageable coupling.

7. A power generating unit according to claim 1, wherein one or more power generating units are arranged to be mounted to one or more power output interfaces at multiple locations on the source of rotational energy.

8. A power generating unit according to claim 7, wherein at least one power generating unit is arranged to be relocatable on the source of rotational energy, whereby at least one power generating unit can be operated in more than one location.

9. A power generating unit according to claim 8, wherein the power generating units and power output interfaces are provided with a common interface for connecting the input shaft of a power generating unit to a driving shaft on a power terminal.

10. A power generating unit according to claim 9, wherein the common interface is provided with means that only allows a power generating unit to be mounted at one or more predetermined power output interfaces.

11. A power generating unit according to claim 9, wherein the common interface is provided with means that prevents a power generating unit from being mounted at one or more predetermined power output interfaces.

12. A power generating unit according to claim 9, wherein the common interface is provided with means that prevents a power generating unit intended for use on a prime mover from being mounted at one or more predetermined power output interfaces on a transmission, and vice versa.

13. A power generating unit according to claim 1, wherein the source of rotational energy is arranged to be operated independently of the power generating unit when the input shaft is disengaged from the driving shaft.

14. A power generating unit according to claim 1, wherein the power generating unit is arranged to supply hydraulic pressure and flow only when the input shaft is engaged to the driving shaft.

15. A vehicle provided with a prime mover and arranged for driving at least one power generating unit according to claim 1, which power generating unit is arranged to supply hydraulic pressure and flow to at least one driven accessory, wherein the power generating unit comprises a housing removably mounted on a source of rotational energy, an input shaft adapted to be connected to the source of rotational energy, said input shaft comprising a first end provided with means for engaging the input shaft to a power output interface on the source of rotational energy, a second end connected to a hydraulic pump and means for selectively engaging the input shaft to the hydraulic pump, where the input shaft, the means for selectively engaging the input shaft, and the hydraulic pump are arranged as an integral power generating unit within said housing.

16. A vehicle according to claim 15, wherein the prime mover is arranged to be operated independently of the power generating unit when the input shaft is disengaged from the driving shaft.

17. A vehicle according to claim 15, wherein the power generating unit is arranged to supply hydraulic pressure and flow only when the input shaft is engaged to the driving shaft.

18. A vehicle according to claim 15, wherein at least one or more power generating units are arranged to be mounted to one or more power output interfaces at multiple locations on the source of rotational energy.

19. A vehicle according to claim 18, wherein at least one power generating unit is arranged to be relocatable on the source of rotational energy, whereby at least one power generating unit can be operated in more than one location.

20. A vehicle according to claim 19, wherein the power generating units and power output interfaces are provided with a common interface for connecting the input shaft of a power generating unit to a driving shaft on a power output interface.

21. A vehicle according to claim 20, wherein the common interface is provided with means that only allows a power generating unit to be mounted at one or more predetermined power output interfaces.

22. A vehicle according to claim 20, wherein the common interface is provided with means that prevents a power generating unit from being mounted at one or more predetermined power output interfaces.

23. A vehicle according to claim 20, wherein the common interface is provided with means that prevents a power generating unit intended for use on a prime mover from being mounted at one or more predetermined power output interfaces on a transmission, and vice versa.

* * * * *